United States Patent

[11] 3,566,026

| [72] | Inventors | Robert L. Bonebreak<br>Los Angeles;<br>David B. Park, Inglewood, Calif.; Philip R. Tulloh, Tucson, Ariz. |
|---|---|---|
| [21] | Appl. No. | 618,674 |
| [22] | Filed | Feb. 27, 1967 |
| [45] | Patented | Feb. 23, 1971 |
| [73] | Assignee | U.S. Philips Corporation, New York, N.Y. |

[54] AUTOMATIC ACQUISITION AND TRACKING SYSTEM
11 Claims, 3 Drawing Figs.

[52] U.S. Cl. ..................................................... 178/6.8,
250/203, 343/7.3
[51] Int. Cl. ...................................................... H04n 3/04
[50] Field of Search............................................ 178/6.8, 6,
(GNAC); 250/203 (CTS); 343/6 (TV), 7.3;
250/217 (CRT)

[56] References Cited
UNITED STATES PATENTS

| 2,849,707 | 8/1958 | White........................... | 250/217CRT |
| 3,158,860 | 11/1964 | Thompson..................... | 343/7.3 |
| 3,315,032 | 4/1967 | Hecker.......................... | 178/6.8 |
| 3,328,793 | 6/1967 | McLaughlin et al........... | 178/6LC |
| 3,336,592 | 8/1967 | Wall.............................. | 343/7.3 |

*Primary Examiner*—Richard Murray
*Assistant Examiner*—Barry Leibowitz
*Attorney*—James K. Haskell and W. J. Adam

ABSTRACT: A system that acquires and tracks an object designated by a light sensor placed over the object's image on a display monitor. The system includes a tracking sensor, such as a television camera, a video tracker and a tracking sensor stabilization unit. Sample and hold circuits are gated by an output pulse of the light sensor at which time these circuits sample the value of the deflection signals of the tracking sensor. The output signals from the sample and hold circuits are applied to switchable amplifier-integrator circuits that preposition the tracking gates of the video tracker. A monitor video gating circuit is coupled to the display monitor for intensification of the display during a portion of the acquisition sequence. Delay and limiting means are coupled between the video tracker and the tracking sensor stabilization unit for allowing the video tracker to stabilize prior to initiating maximum sensor position tracking rates.

3,566,026

AUTOMATIC ACQUISITION AND TRACKING SYSTEM

BACKGROUND OF THE INVENTION

This invention relates generally to acquisition and tracking systems and particularly to video tracking systems having improved acquisition capabilities.

Tracking systems broadly comprise the circuit means for aligning the tracking axis of a sensor (such as a television camera) with the position in space of a designated object; and may be utilized for example, as the guidance control element for aircraft or ground based armament launch and control systems. One of the most significant problems of prior art tracking systems is the amount of time required for an operator to designate a selected object and initiate tracking thereof. Prior art tracking systems either require the operator to manually position tracking gates around the selected object image on a display monitor or the tracking gates are clamped to the center of the field of view of the tracking sensor and the operator positions the sensor with manual controls or maneuvers the vehicle (in airborne systems) until the image of the selected object is within the tracking gates. Each of the just described methods depends heavily on the skill of the operator, and due to the relative motion between the object and the tracking sensor, acquisition times of prior art tracking systems are relatively long and vary both as a function of the operational environment and operator skill.

SUMMARY OF THE INVENTION

In accordance with a preferred embodiment of the invention, a television (TV) camera's optical axis is both stabilized and positioned using a gyroscope (gyro) stabilization assembly and associated electronics. A target, which is in the TV camera's field of view, is acquired by an operator first positioning a light sensor assembly over the target image on a TV monitor. By depressing a mode control push button on the light sensor assembly, the operator activates gated position sampling circuitry which translates the horizontal and vertical coordinates of the light sensor relative to the monitor display, and hence the target position, into analogue voltages which are applied to switchable integrator-amplifier circuits. Initially, these analogue voltage output signals are used to preposition a video tracker's tracking gates over the desired target. Camera video is processed by the video tracker in such a manner as to produce output signals whose amplitude and polarity are a function of selected target's displacement from the center of the camera's field of view. These tracker's output signals are processed in an inertial tracking loop to automatically align the TV camera's optical axis with the target line of sight in the case of a stationary target, or to offset the optical axis an amount proportional to target velocity in the case of a moving target. After allowing a suitable time for the video tracker to acquire and track the target, the inertial loop is closed, and the tracker's output signals are applied to the gyro stabilization system. Limiting circuits are coupled to the gyro stabilization system to limit the voltage amplitudes of the tracker's signals for a short period after target acquisition to prevent the gyro precession rates from exceeding the maximum video tracker tracking rates. A monitor video gating circuit is coupled to the TV monitor for increasing the display intensity during an initial portion of the acquisition period. This monitor intensity increase provides dependable acquisition over all ranges of the TV monitor control settings and target energy intensity and contrast conditions.

The system in accordance with the principles of the invention can rapidly acquire a target appearing anywhere on the display monitor with an order of magnitude reduction in target acquisition time over prior art techniques. This is accomplished by improving the man-machine interface in such a manner that less of the target acquisition task is placed upon an operator's relatively slow responses, and more of the task is delegated to faster responding electronics. This improvement is provided with little increase in system complexity and with great flexibility in adaptation to the particular operating modes and environments required for a given tactical application.

It is therefore an object of the present invention to provide tracking systems with improved acquisition capabilities.

A further object is to provide automatic acquisition systems for the rapid designation and acquisition of a selected target.

A still further object is to provide automatic acquisition techniques compatible with conventional video tracking systems.

Another object is to provide an acquisition system that utilizes a light sensor that may be positioned adjacent to a selected object's image on a display monitor to acquire and initiate tracking of the object.

A still further objective is to provide an acquisition system that utilizes techniques for temporarily increasing the light intensity of a display monitor so that a selected object may be reliably designated by positioning a light sensor adjacent to the location of the object's image on the display monitor.

Another object is to provide a tracking system that includes delay and limiting means coupled to a tracking sensor stabilization loop to provide stable transition between the acquisition and tracking of a selected object.

BRIEF DESCRIPTION OF THE DRAWINGS

The novel features which are believed to be characteristic of the invention both as to its organization and method of operation, together with further objects and advantages thereof, will be better understood from the following description considered in connection with the accompanying drawings in which like characters refer to like parts and in which.

DESCRIPTION OF THE PREFERRED EMBODIMENT

Figure 1:
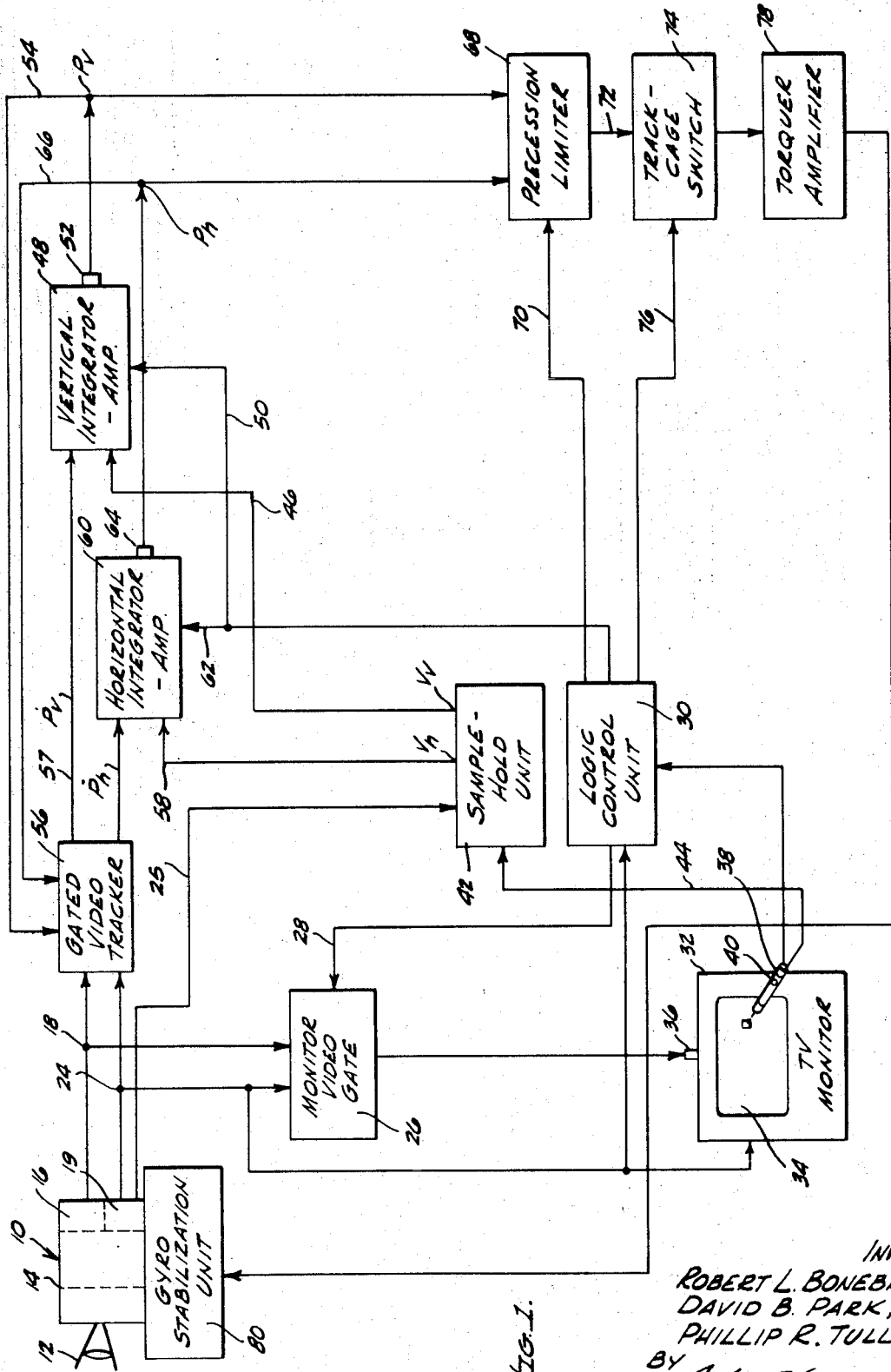
FIG. 1 is a block diagram illustrating an acquisition and tracking system embodying the principles of this invention.

Referring first to FIG. 1 which shows a preferred embodiment of an acquisition and tracking system in accordance with the principles of the invention, a TV (television) camera 10, which may be a conventional vidicon unit, includes an optical network 12 for forming images on a screen 14 in response to energy received from a sector of space. A signal output circuit 16, of the TV camera 10, develops video signals which are amplitude representative of the energy received by the increments of area of the screen 14 as the screen is scanned by the output circuit 16. These video signals generated by the circuit 16 are transmitted to a terminal 18. The output circuit 16 is controlled in a conventional TV scan pattern by a scan control circuit 19 that also provides horizontal and vertical deflection signals through a composite lead 25. Horizontal and vertical synchronization (sync) signals are provided by the scan control circuit 19 along a composite lead 24.

A monitor video gate circuit 26 is controlled by a monitor gating signal applied through a lead 28 from a logic control unit 30. A conventional TV monitor 32 includes a display tube 34, and a scanning beam that is positioned in response to deflection circuits (not shown). The last mentioned deflection circuits are synchronized by the horizontal and vertical sync pulses applied through the composite lead 24. The monitor video gate 26 applies the video signal from the terminal 18 to a video input terminal 36 of the TV monitor 32 in the absence of the monitor gating signal applied through the lead 28. When the monitor gating signal is present, the monitor video gate circuit 26 applies the sum of the horizontal and vertical sync pulses from the composite lead 24 to the input terminal 36.

The signal applied to the input terminal 36 controls the intensity of the monitor scanning beam and therefore the light intensity of the display tube 34. A light sensor 38 provides a signal output pulse only as the scanning beam sweeps past the sensor 38 when the sensor is positioned on or close to the surface of the display tube 34. A mode control push button circuit 40 (shown symbolically) provides control pulses to the logic control unit 30 and in response to these control pulses the logic unit applies the monitor gating signal along the lead 28 to the monitor video gate 26. This monitor gating signal switches the monitor video gate circuit 26 so that the composite horizontal and vertical sync pulses are applied to the video input terminal 36 for a predetermined time period (for example during two vertical frames). The polarity of the combined sync pulses is such that the monitor scanning beam is at a uniformly high intensity level, thereby insuring that as the scanning beam sweeps past the position of the light sensor 38 that an output pulse will be generated.

The output pulse generated by the light sensor 38 is applied to a sample-hold or position sampling unit 42 through a led 44. The sample-hold unit 42 has two separate channels that sample the value of the horizontal and vertical deflection signals (applied through the composite lead 25), at the time of occurrence of the light sensor signal, and provide tracking gate position voltages $V_h$ and $V_v$, respectively. Each channel of the sample-hold unit 42 may include a conventional gated box-car circuit. The signals $V_h$ and $V_v$ are representative of the horizontal and vertical positions, respectively, of the light sensor on the face of the display tube 34 and, therefore, on the screen 14 of the TV camera.

The signal $V_v$ is applied through a lead 46 to a vertical integrator-amplifier 48. The integrator-amplifier 48 will be explained in detail subsequently, but for now it may be described functionally as a unit that in response to a sample switching signal applied through lead 50 from the logic control unit 30, provides a voltage $P_v$ at an output terminal 52 which is an inverted amplified reproduction of the input voltage applied through the lead 46. The voltage $P_v$ is applied along a lead 54 to a gated video tracker 56. Any suitable conventional tracker that produces output signals, the amplitude and polarity of which are a function of a selected target's displacement from the center of the camera's field of view may be utilized for the tracker 56, for example the conventional "early-late" gate type video tracker.

In a similar manner the voltage $V_h$ is applied through a led 58 to a horizontal integrator-amplifier 60 which is controlled by the sample switching signal applied through a lead 62. The output signal $P_h$ at a terminal 64 is transmitted through a lead 66 to the gated video tracker 56.

The gated video tracker 56 may be any one of numerous suitable types that are well-known in the art. The video signal from the TV camera 10 is applied to the gated video tracker 56 from the terminal 18, and horizontal and vertical sync pulses are applied to the tracker along the composite lead 24. The voltages $P_v$ and $P_h$ preposition the time of occurrence of vertical and horizontal tracking gates, respectively, of the tracker 56 relative to the vertical and horizontal sync pulses. The tracker provides output signals $P_v$ and $P_h$ whose amplitudes and polarities are a function of the time displacement of the target video signal from the center of the vertical and horizontal tracking gates, respectively.

The signal $P_v$ is applied to the vertical integrator-amplifier 48 and in the absence of the sample switching signal applied through the lead 50, the signal $P_v$ is integrated by the vertical integrator-amplifier and applied through to output terminal 52. In a similar manner, the signal $P_h$ is applied to the horizontal integrator-amplifier 60, and in the absence of the sample switching signal applied along lead 62, signal $P_h$ is integrated and then transmitted to the output terminal 64.

The signals $P_v$ and $P_h$ are applied to a precession limiter 68, and after being processed therein are transmitted through a composite lead 72 to a track-cage switch 74. In the absence of a limiter gating signal, applied to limiter 68 through a lead 70 from the logic control unit 30, the signals $P_v$ and $P_h$ are transmitted through the limiter 68 without modification. However, when the limiter gating signal is present the amplitudes of both signals $P_v$ and $P_h$ are limited to predetermined voltage values.

When a track gating signal is applied to track-cage switch 74 through a lead 76 from the logic control unit 30, the output signals of the limiter 68 are applied to a torquer amplifier 78 and after amplification therein to the gyroscope (gyro) stabilization unit 80. The gyro stabilization unit which may be any suitable type of the numerous such units well-known in the art, may include a gyro and horizontal and vertical torquer units (not shown). The signals $P_v$ and $P_h$, after processing by the limiter 68 and amplifier 78, activates the vertical and horizontal torquer units, respectively, which in turn precess the gyroscope. The TV camera 10 is mechanically coupled to the stabilization unit 80 and therefore is positioned in response to the signals $P_v$ and $P_h$. In the absence of the track gating signal applied along the lead 76, the track-cage switch 74 provides output signals through the amplifier 78 which maintains the position of the TV camera 10 along a preselected boresight position.

In the operation of the system of FIG. 1 a target which is in the field of view of TV camera 10 is acquired by an operator by first positioning the light sensor 38 over the target's image on the display tube 34. By depressing the mode control push button 40, a sequence of events is initiated which translates the horizontal and vertical position coordinates of the light sensor relative to the display tube 34, and hence the target position, into analogue voltages, $V_h$ and $V_v$, which are applied to the switchable horizontal and vertical integrator-amplifiers 60 and 48, respectively. The resultant analogue output signals $P_h$ and $P_v$ of the integrator-amplifier circuits are then applied to the gated video tracker 56. Initially these analogue voltages, $P_h$ and $P_v$, are used to preposition the tracking gates of the tracker 56 into coincidence with the desired target. After allowing a suitable time period for the tracker 56 to stabilize, the inertial tracking loop is closed by the application of the track gating signal to track-cage switch 74 through the lead 76. The precession limiter circuit 68 in response to limiter gating signals applied along the lead 70, limits the voltage levels of the signals $P_v$ and $P_h$ applied to the inertial loop to prevent the gyro precession rates from exceeding the maximum tracking rates of the gated video tracker 56.

Figure 2:
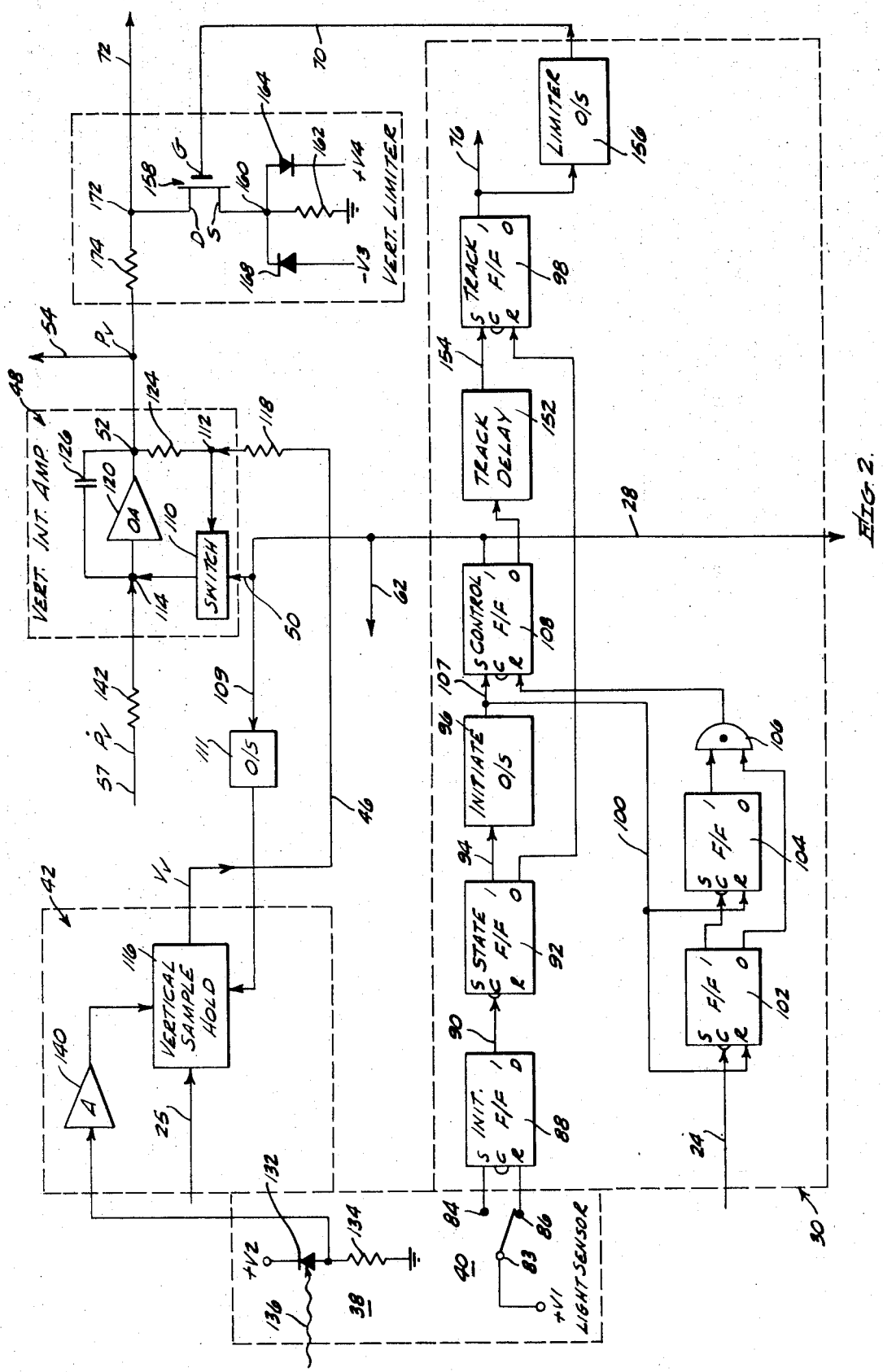
FIG. 2 is a block and schematic diagram for further explaining one embodiment of the acquisition system in accordance with this invention.

The just described operation of the system of FIG. 1 may be better understood by reference to the more detailed circuit and block diagram of FIG. 2. Referring now to FIG. 2, a terminal 83 of the mode control push button 40 is coupled to a suitable positive voltage source +V1. A terminal 84 is coupled to the set S input terminal of a flip-flop 88 of the logic control unit 30 and a terminal 86 to the reset R input terminal of the flip-flop 88. The logic control unit 30 may utilize basic digital logic where the two binary conditions are labeled 1 and 0. The 1 condition may indicate the presence of a signal and the 0 condition may indicate the lack of a signal. The text "Digital Computer Components and Circuits", by T.K. Richards, 1957, published by Van Nostrand, describes suitable digital circuits that may be utilized in the logic control unit 30. For the basic flip-flop symbol as shown in FIG. 2, a flip-flop is set by applying a 1 signal to the set S input terminal; this provides a 1 signal at the 1 output terminal and a 0 signal at the 0 output terminal. The flip-flop circuit is reset by applying a 1 signal to the reset R input terminal thus providing a 0 signal at the 1 output terminal and a 1 signal at the 0 output terminal. There is no effect on the circuit if a set input signal is applied when the circuit is already set or if a reset input signal is applied when the flip-flop has been previously reset. A signal applied to a third input terminal, called the complement input terminal C, operates to reverse the condition of the circuits prior to its application; that is, if the circuit were set before the application of the signal, it would be reset by the signal and similarly if the circuit were reset before the application of the signal, it would be set by that signal. When the element 83 of the mode push button 40 is momentarily positioned in contact with the terminal 84, the flip-flop 88 is set and a 1 output level signal is applied through a lead 90 to the C input terminal of a state flipflop 92. In response to the signal applied through the lead 90, the state flip-flop changes output conditions. Assuming that the state flip-flop 92 is initially in the reset condition, it will be triggered to the set condition, and the 1 output level signal applied through the lead 94 will trigger an initiate monostable multivibrator 96 (commonly referred to as a one-shot). The 0 output terminal of the state flip-flop 92 is coupled to the R input terminal of a track flip-flop 98. An output pulse from the one-shot 96, which may have a pulse width of 100 nanoseconds, is applied through the composite lead 100 to reset a flip-flop 102 and a flip-flop 104, and also through a lead 107 to an S input terminal of a control flip-flop 108.

Vertical sync pulses are applied through the composite lead 24 from the TV camera 10 (FIG. 1) to the C input terminal of the flip-flop 102 and the 1 output terminal of the flip-flop 102 is coupled to the C input terminal of the flip-flop 104. The 1 output terminal of the flip-flop 104 is connected to an input terminal of the AND gate 106 and the 0 output terminal of the flip-flop 102 is coupled to a second input terminal of the AND gate 106. The output of the AND gate 106 is connected to the R input terminal of the control flip-flop 108.

In response to the signal applied through the lead 107, the control flip-flop 108 is set and the signal at the 1 output terminal thereof switches to the 1 level state. The 1 output terminal of the flip-flop 108 is coupled by a lead 50 to a gate input terminal of an electronic switch 110 which may be any suitable conventional type such as a conventional transistor switching stage. The signal at the 1 output terminal of flip-flop 108 is also applied through a lead 109 and a one-shot 111 to a sample and hold circuit 116. In response to the output gating pulse of one-shot 111, which may be a 100 nanosecond wide positive pulse, the circuit 116 is reset to a reference potential level.

The output signal, $V_v$, of a vertical sample hold circuit 116 is applied through the lead 46 and through a resistor 118 to a terminal 112. When the sample switching signal is applied through the lead 50, the switch 110 couples the terminal 112 to an input terminal 114 of a conventional operational amplifier 120. A resistor 124 is connected between the output terminal 52 of the operational amplifier and the terminal 112. A capacitor 126 is coupled between the output terminal 52 and the input terminal 114. When the switch 110 is closed, the output signal at the terminal 52 is an amplified reproduction of the signal $V_v$, coupled through the lead 46.

The light sensor 38 includes a photodiode 132 having a cathode terminal connected to a suitable source of DC potential, V2, and an anode terminal coupled through a resistor 134 to ground. In response to light energy from the display tube 34, (shown symbolically by an arrow 136) the diode 132, which may be any suitable photodiode such as a IN3734, generates a pulsed signal at the anode terminal. A relatively fast response is required for light sensor 38 and this may be achieved by optically limiting the field of view of the light sensor and by the proper selection of the value of potential V2 and the load resistor 134. Satisfactory response has been achieved with the potential V2 set at +30 volts DC (direct current) and a value of resistor 134 of 10K (10,000) ohms.

The pulsed signal at the anode terminal of diode 132 is applied through a conventional video amplifier 140 to a gating input terminal of the vertical sample and hold circuit 116. A gain of 10 has been found adequate for the amplifier 140. During the occurence of the pulse signal at the anode of diode 132, the sample-hold circuit 116 charges a storage element (not shown), such as a capacitor, to the value of the vertical deflection signal that is applied to the composite lead 25 from the TV camera 10 (FIG. 1). Numerous sample-hold circuits are known in the art as circuit means exhibiting low charging impedance during the presence of a gating pulse, and a high discharge impedance when the gating pulse is absent. As discussed previously, the signal at the output terminal of the sample-hold circuit 116, $V_v$, is coupled through the resistor 118 and the switch 110 (when switch 110 is gated on) to the vertical integrator-amplifier 48.

The signal $P_v$ is applied from the gated video tracker 56 (FIG. 1) through a lead 57 and a resistor 142 to the input terminal 114 of the vertical integrator-amplifier 48. When the switch 110 is closed, the signal coupled through the resistor 142 has negligible effect on the value of the output signal at the terminal 52 and the vertical integrator-amplifier operates as a conventional inverting amplifier. However, when the switch 110 is open, the operational amplifier 120 in conjunction with the capacitor 126 form a conventional electronic integrator and the signal at terminal 52 is the integral of the signal $P_v$ applied through the lead 57. As described previously, the signal at the terminal 52, $P_v$, is applied through the lead 54 to the gated video tracker 56 (FIG. 1) wherein it is utilized to control the relative time position of the vertical tracking gate of tracker 56.

The signal at the 1 output terminal of the flip-flop 108 is also applied through the lead 28 to gate the monitor video gate 26 (FIG. 1). The 0 output terminal of the control flip-flop 108 is coupled to a track delay circuit 152. After a suitable time delay, for example 16.7 milliseconds, the circuit 152 generates an output pulse that is applied through a lead 154 to the S input terminal of the track flip-flop 98. The 1 output terminal of flip-flop 98 is coupled by the lead 76 to the track-cage switch 74 (FIG. 1), and to a limiter one-shot 156 that generates a pulse of a predetermined width, for example 300 milliseconds.

The output signal pulse of the one-shot 156 is applied through a lead 70 to the gate terminal of a field-effect transistor 150, which may be a FI 100. A source terminal of transistor 158 is coupled to a terminal 160 and through a resistor 162 to ground, and a drain terminal of the transistor 158 is connected to a terminal 172. The anode terminal of a diode 164 is connected to the terminal 160 and a cathode terminal is coupled to a suitable source of positive DC potential +V4. The terminal 160 is also connected to the cathode of a diode 168, the anode terminal thereof being coupled to a suitable source of negative DC potential −V3. When a limiting gate signal is applied through the lead 70 to the gate terminal of the transistor 158, the potential at the terminal 172 is limited to potential values between +V4 and −V3. The signal $P_v$ is applied from the output terminal 52 through a resistor 174 to the terminal 172 and then through composite lead 72 to the track-cage switch 74 (FIG. 1).

The mechanization of the horizontal channel of sample-hold unit 42, horizontal integrator-amplifier 60 and the horizontal channel of precession limiter 68 (FIG. 1) is similar to that just described for the vertical channel relative to FIG. 2 and in the interest of clarity is not shown in greater detail.

Figure 3:
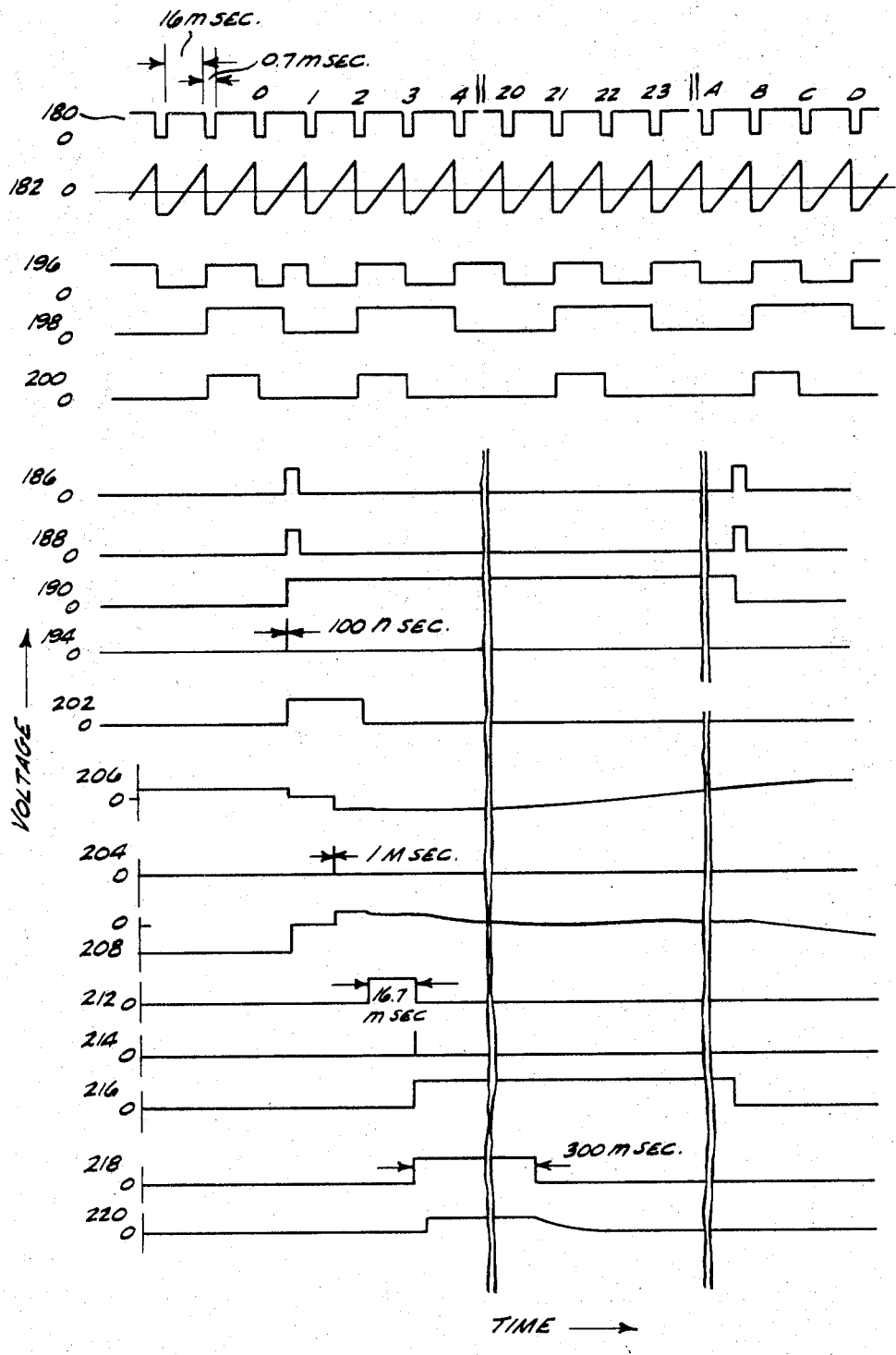
FIG. 3 is a diagram of voltage vs time waveforms for explaining the operation of the system in accordance with the invention.

The operation of the system in accordance with the principles of the invention may be better understood by consideration of FIG. 3 which shows voltage vs time waveforms at time intervals during the acquisition and track sequence of a selected target. Referring now to FIGS. 1 and 2, as well as FIG. 3, a waveform 180 (FIG. 3) shows the waveforms of vertical sync pulses that are applied from the TV camera 10 (FIG. 1) through the composite lead 24. The time interval of 16.7 milliseconds between vertical sync pulses, as well as the other timing values, shown in FIG. 3 are examples of one suitable time base only and it is understood that any suitable time base may be utilized in accordance with the principles of the invention. The waveforms of the vertical sync pulses labeled 0 through 23 (waveform 180, FIG. 3) are related to the time sequence during which the system changes from the acquisition mode to the track mode and the vertical sync pulses labeled A through D are related to the timing sequences for changing back to the acquisition mode. The vertical deflection signal applied to the vertical sample-hold circuit 116 through the composite lead 25 (FIG. 1) is shown by a waveform 182.

The acquisition mode is initiated by the operator placing the light sensor 38 (FIG. 1) over the target's image on the display tube 34 and depressing the mode control push button 40. This is shown in a waveform 186 as occurring between vertical sync pulse 0 and 1. In response to the signal generated by circuit 40 shown by the waveform 186, the initiate flip-flop 88 (FIG. 2)

is set as depicted by the waveform 188 The signal at the 1 output terminal of the flip-flop 88, applied through the lead 90, sets the state flip-flop 92; and the signal at the 1 output terminal of the state flip-flop 92 (shown by a waveform 190) triggers the initiate one-shot 96. The output pulse of the initiate one-shot 96 (waveform 194) sets the control flip-flop 108 and also resets flip-flops 102 and 104 to respective 0, 0 states. The 0 terminal signal of the flip-flop 102 is shown by a waveform 196 and the waveform of the signal at the 1 output terminal of the flip-flop 102 is shown by a waveform 198. The AND gate 106, which is coupled to flip-flop 102 and flip-flop 104, produces a 1 level output pulse (waveform 200) at the time of occurrence of the second vertical sync pulse after the reset signal (waveform 194).

The waveform of the signal at the 1 output terminal of the control flip-flop 108 is shown by a waveform 202, and this signal is applied through a lead 109 to the one-shot 111. The output signal of one-shot 111 resets the vertical sample- hold circuit 116 to a reference potential level in order to reduce the charging current required during the sampling period. Also the signal at the 1 output terminal of the flip-flop 108 is applied through the lead 50 to the switch 110 and in response to this signal, switch 110 closes, thereby converting the vertical integrator-amplifier 48 into an inverting amplifier. At some time during the period that the flip-flop 98 is set (depending on the position of light sensor 38 on the display tube 34) the scanning beam of the TV monitor 32 (FIG. 1) sweeps past the light sensor 38 producing an output pulse at the anode terminal of the diode 132 (FIG. 2) as shown by a waveform 204. This light sensor output pulse, after being processed by the amplifier 140 (FIG. 2), gates the sample-hold circuit 116 which in response thereto samples the then existing potential of the vertical deflection signal (waveform 182). The output signal of the vertical sample-hold circuit 116, $V_v$, (waveform 206) is transmitted through the resistor 118 and the switch 110 to the input terminal 114. This signal $V_v$ updates the output potential, $P_v$, of the vertical integrator-amplifier 48 at the terminal 52 as is shown by a waveform 208.

At the occurrence of the second vertical sync pulse after the initiate pulse (waveform 194), the output signal of the AND gate 106 (waveform 200) switches to the 1 level resulting in the control flip-flop 108 being reset and thereby returning the just described circuits, that this flip-flop controls, to their normal state. It should be noted that the mechanization of the flip-flops 102, 104, and the AND gate 106 is such that control flip-flop 108 is set for at least one complete vertical frame to insure that a target will be detected regardless of the time that the acquisition mode is initiated or the position of the target on the display tube 34.

The signal at the 0 output terminal of the control flip-flop 108 triggers the track delay circuit 152 which after a suitable delay, for example 16.7 milliseconds as shown by a waveform 212, generates a pulse (waveform 214) that sets the track flip-flop 98. The purpose of the track delay circuit 152 is to allow time for the gated video tracker 56 to stabilize, after being updated by the position voltage $V_v$, prior to closing the inertial tracker loop through the track-cage switch 74.

When the track flip-flop 98 is set (waveform 216, FIG. 3), the inertial track loop is closed through the track-cage switch 74 and the limiter one-shot 156 is triggered. The limiter one-shot 156 produces an output pulse of a predetermined pulse width (for example, 300 milliseconds) as is shown by a waveform 218. The output signal of the limiter one-shot 156 gates the precession limiter 68 (FIG. 1) that in turn limits the precession rate of the gyro stabilizer unit 80 during the initial portion of the tracking period. This limiting operation insures that the rate of change of position of the TV camera 10 does not exceed the tracking rate limits of video tracker 56 (FIG. 1), The signal $P_v$ after processing through the precession limiter 68 is shown by the waveform 220 of FIG. 3.

The system may be returned to the acquisition mode by depressing the mode control push button 40 a second time. This is shown as occurring between the vertical sync pulses labeled A and B in the waveforms 180 and 186 at the time indicated by the pulse of the waveform. As a result of the output signal of the initiate flip-flop 88, transmitted through lead 90, the state flip-flop 92 is reset thereby triggering one-shot 93 which in turn resets the track flip-flop 98. The signal at the 1 output terminal of the flip-flop 98 switches the track-cage switch 74 to the cage mode and the system is ready to acquire and track another target when the operator again depresses the mode control push button 40.

In the interest of clarity only the vertical tracking channel was considered in the preceding discussion of the waveforms of FIG. 3, however, it would be readily apparent to those skilled in the art that the horizontal channel functions in a similar manner.

Although only one embodiment of this invention has been described herein, it will be appreciated by those skilled in the art that other arrangements may be used in accordance with the principles of this invention. For instance, variations in the control logic, system timing, or delay values may be utilized. Also, since the principles of this invention are unaffected by the spectral band of the tracking sensor element, any suitable sensor, for example infrared or ultraviolet types, may be utilized instead of the TV camera. Although in the illustrated system the target is tracked in two dimensions, it is to be understood that the principles of the invention may include systems operating in one or two dimensions. Further, it is noted that the term space is to include any portion of the atmosphere or outer space.

Thus, the automatic acquisition and tracking system in accordance with this invention utilizes a light sensor to preposition the tracking gates of any suitable conventional video tracker into time coincidence with a target's image designated on a monitor display tube. Temporary monitor display intensification is provided to insure reliable designation of all targets regardless of variations in target energy intensity or contrast. The tracking response of an inertial tracking loop is delayed and limited for predetermined time intervals to provide a stable transition between the acquisition and track modes.

We claim:
1. A target acquisition system comprising:
 a tracking sensor having a tracking axis and being responsive to energy received from a sector in space surrounding and including a selected target for producing video signals having amplitudes representative of the intensity of the received energy;
 a gated video tracker, including tracking gate generators, coupled to said tracking sensor for producing output signals corresponding to the position of the selected target relative to the tracking axis of said tracking sensor;
 a display monitor, including a display screen, coupled to said tracking sensor for forming images on the display screen in response to the video signals;
 position sampling means coupled to said tracking sensor and being responsive to light energy emitted from the selected target image on said display screen for generating position voltages representative of the position of the selected target image relative to said display screen; and
 integrator-amplifier means coupled to said gated video tracker and to said position sampling means and responsive to the respective output signals and position voltages therefrom for positioning the tracking gates into time coincidence with the position of the desired target image relative to said display screen.
2. The system of claim 1 further comprising:
 a logic control unit coupled to said tracking sensor and to said integrator-amplifier means for generating signals to control the operation of said integrator-amplifier means; and
 a monitor video gate circuit coupled between said tracking sensor and said display monitor and to said logic control unit, said monitor circuit being controlled by said logic control unit for increasing the light intensity produced by said display tube during a selected interval of time.

3. A system for prepositioning the tracking gates of a video tracker into time coincidence with a selected target image comprising:
  a tracking sensor responsive to the energy from a sector in space;
  a gated video tracker, including tracking gate generators, coupled to said tracking sensor;
  a display monitor, including a display tube, coupled to said tracking sensor;
  a light sensor responsive to light energy emitted from said display tube;
  position sampling means coupled to said light sensor and to said tracking sensor for generating position voltages representative of the position of said light sensor relative to said display tube; and
  integrator means coupled to said gated video tracker and to said position sampling means and responsive to the position voltages for positioning the tracking gates into time coincidence with a target designated by the relative position of said light sensor.

4. The system of claim 3 further comprising:
  a logic control unit coupled to said tracking sensor and to said light sensor; and
  a monitor video gating circuit coupled between said tracking sensor and said display monitor and to said logic control unit, said monitor circuit being controlled by said logic control unit for increasing the light intensity produced by said display tube during a selected interval of time.

5. A system for the acquisition and tracking of a selected object in space in response to energy received therefrom comprising:
  a tracking sensor responsive to energy received from a sector in space;
  a gated video tracker having first and second input circuits and having an output circuit, with said first input circuit coupled to said tracking sensor;
  a display monitor coupled to said tracking sensor and including a display screen;
  a light sensor responsive to light energy emitted from said display screen;
  a sample-hold circuit coupled to said light sensor and to said tracking sensor for generating position voltages representative of the position of said light sensor relative to said display screen;
  a logic control unit having a first input circuit coupled to said tracking sensor, having a second input circuit coupled to said light sensor, and having a first output terminal;
  an integrator-amplifier having a first input circuit coupled to said output circuit of said gated video tracker, having a second input circuit coupled to said sample-hold circuit, having an output circuit coupled to said second input circuit of said gated video tracker, and having a switching input circuit coupled to said first output terminal of said logic control circuit; and
  stabilization means having an input circuit coupled to said output circuit of said integrator-amplifier and an output means coupled to said tracking sensor.

6. The system as set forth in claim 5, with said logic control unit having a second output terminal and further comprising a monitor video gate connected in the coupling between said tracking sensor and said display monitor, and having a control input terminal coupled to said second output terminal of said logic control unit.

7. The system as set forth in claim 5, with said logic control unit having a third output terminal and further comprising a track-cage switch connected in the coupling between said stabilization means and said integrator-amplifier, and having a control terminal coupled to said third output terminal of said logic control unit.

8. The system as set forth in claim 7, with said logic control unit having a fourth output terminal and further comprising a limiter connected in the coupling between said integrator-amplifier and said track-cage switch, and having a control input circuit coupled to said fourth output terminal of said logic control means.

9. A system for the acquisition and tracking of an object in response to energy received from a sector in space, comprising:
  transducer means, including a tracking axis, and responsive to received energy from a sector of space for producing signals having amplitudes representative of the intensity of the received energy;
  a display monitor, including a display screen, for forming images on the display screen in response to said transducer signals;
  a light sensor responsive to light energy emitted from said display screen and movable to positions adjacent to a selected object image on said display screen;
  position sampling means coupled to said light sensor and to said transducer means, for generating signals representative of the position of said light sensor relative to said display screen;
  video tracking means coupled to said transducer means and to said position sampling means for developing difference signals that are amplitude representative of the location of the selected object relative to the tracking axis of said transducer;
  limiter means coupled to said video tracking means and responsive to said difference signals for limiting the magnitude of the difference signals during a selected time period; and
  stabilization means coupled to said limiter means and to said transducer means for aligning the tracking axis of said transducer means to coincide with location of the selected object in space.

10. The system of claim 9 further comprising tracking delay means coupled between said limiter means and said stabilization means for inhibiting the difference signals for a selected period of time.

11. The system of claim 10 further comprising a monitor video gating means coupled between said transducer means and said display means for generating video intensification signals for increasing the light intensity produced by said display screen during a selected interval of time.